No. 828,166. PATENTED AUG. 7, 1906.
E. WISWALL.
LEVELING ROD.
APPLICATION FILED APR. 7, 1906.
3 SHEETS—SHEET 1.
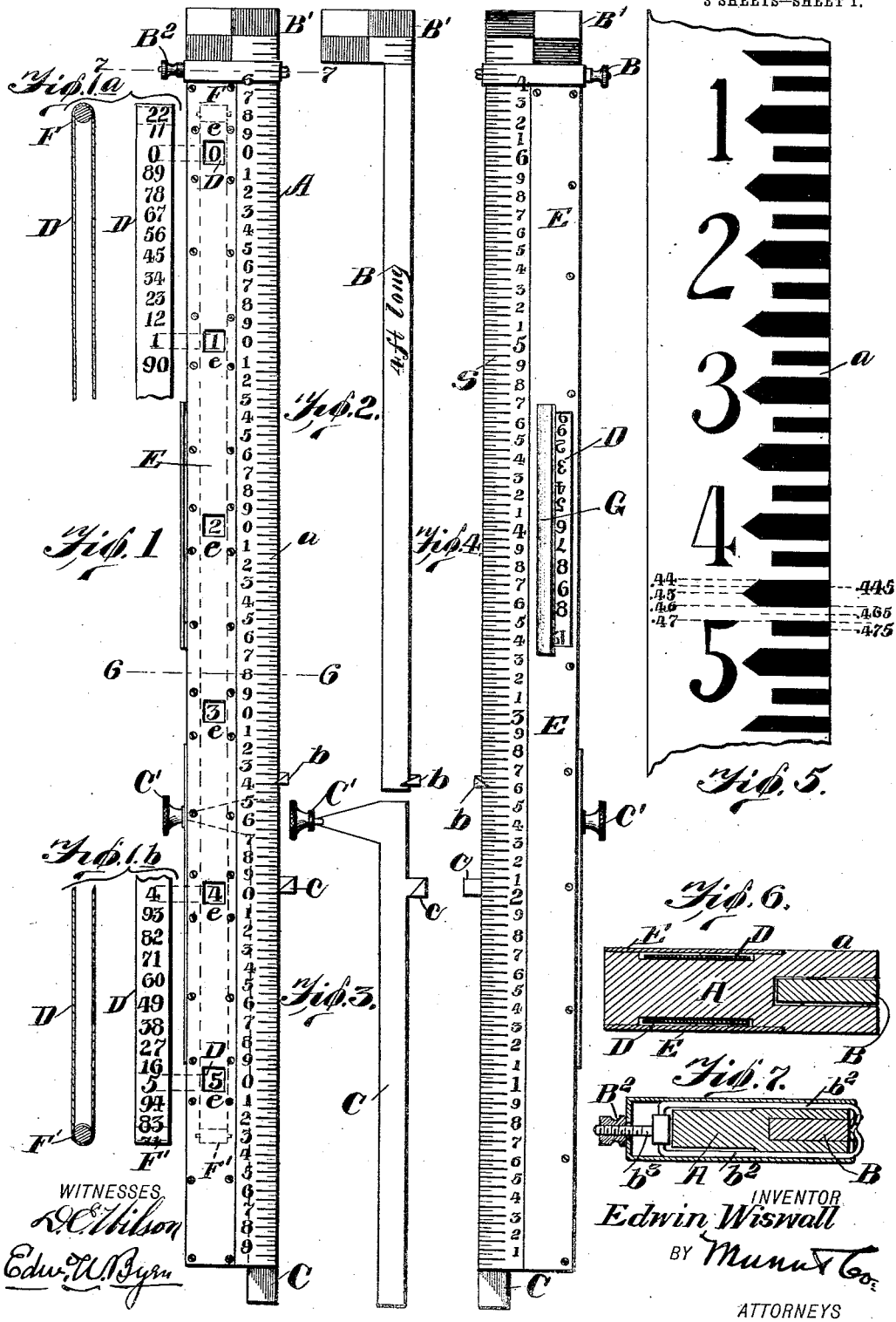
INVENTOR
Edwin Wiswall

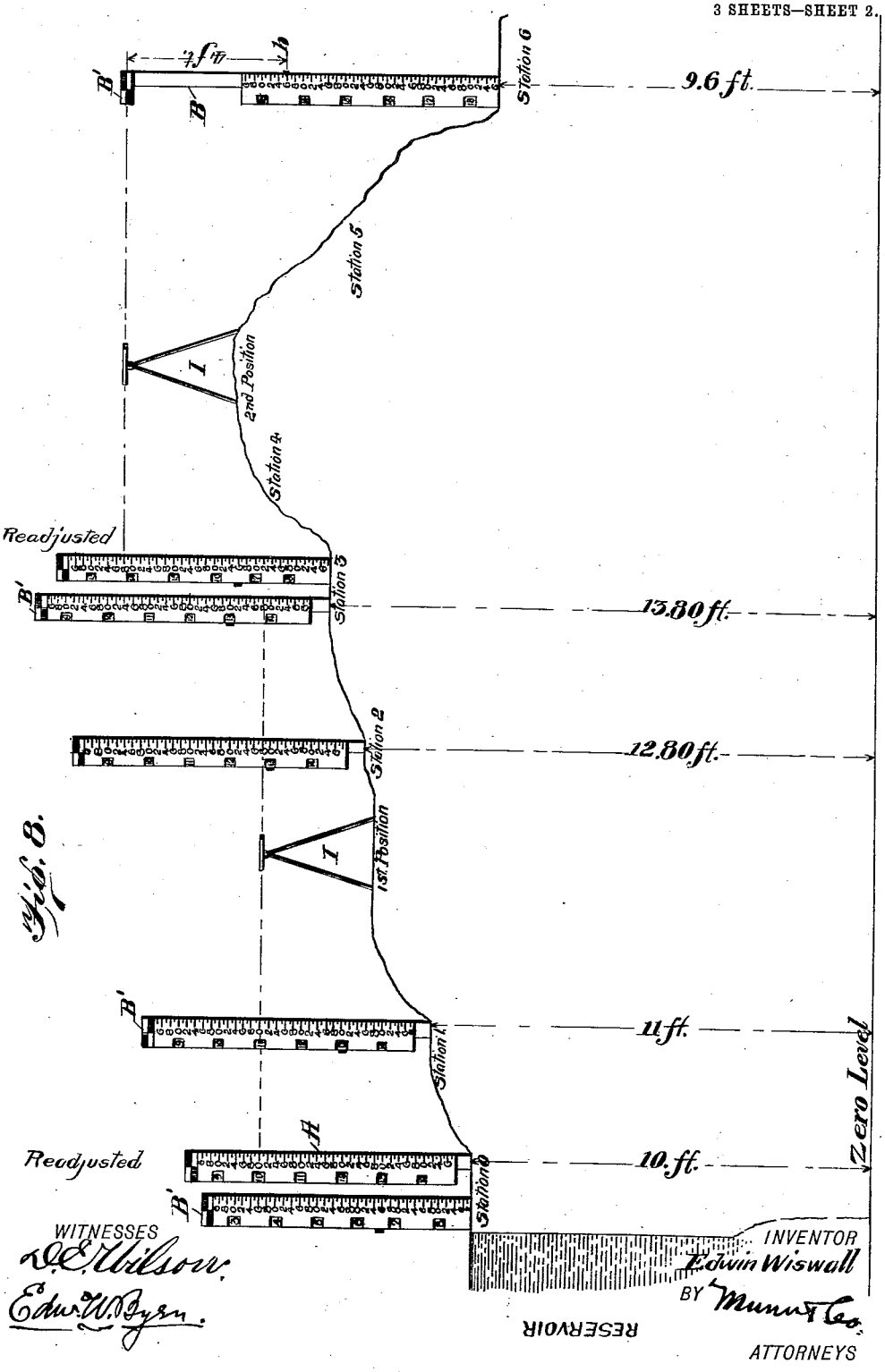

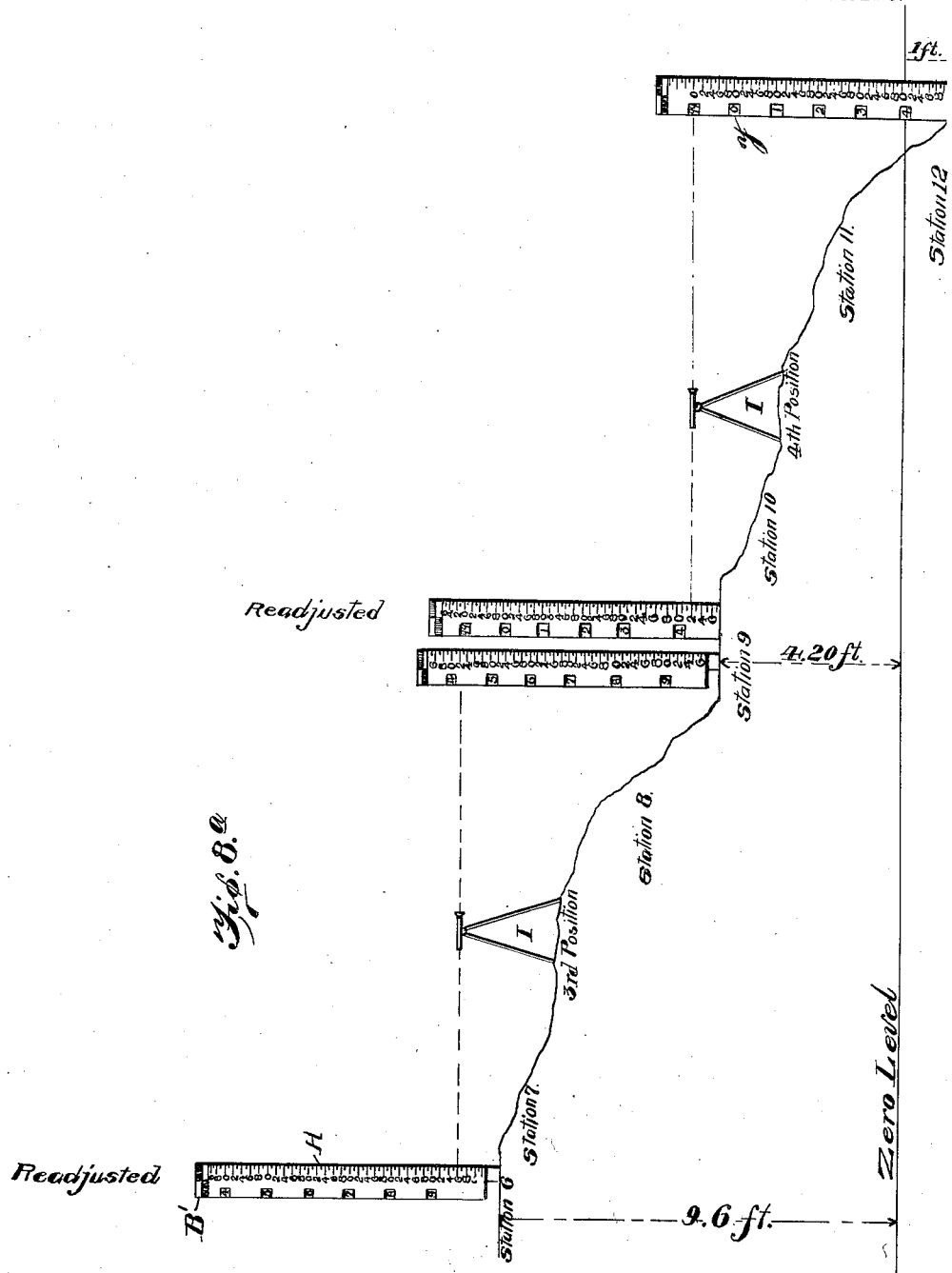

UNITED STATES PATENT OFFICE.

EDWIN WISWALL, OF LAWRENCEVILLE, ILLINOIS.

LEVELING-ROD.

No. 828,166.      Specification of Letters Patent.      Patented Aug. 7, 1906.

Application filed April 7, 1906. Serial No. 310,448.

*To all whom it may concern:*

Be it known that I, EDWIN WISWALL, a citizen of the United States, residing at Lawrenceville, in the county of Lawrence and State of Illinois, have invented a new and useful Improvement in Leveling-Rods, of which the following is a specification.

My invention is in the nature of a novel leveling-rod for the use of surveyors, engineers, and others in establishing levels and which shall be self-reading, or, in other words, shall indicate on its face without computation the distance in level between any two points, so as to permit of rapid work and avoid the errors incident to computation.

It consists in an endless belt used in connection with the rod proper, which belt is provided with a novel sequence of numbers.

It also consists in a novel construction and arrangement of foot-slide, and, further, in a novel graduated scale designed to catch the eye and fix the reading of the hair-lines from a distance with certainty and which scale can be read to one-half a hundredth, all as hereinafter fully described with reference to the drawings, in which—

Figure 1 is a front elevation of the leveling-rod. Fig. 1$^a$ shows two fragmental views of the upper end of the endless number-belt, the view on the left being a sectional view and that on the right being a face view of a part of the belt numbered in a peculiar way in arithmetical progression, the numbers of this belt that show at same time being placed opposite the windows $e$ of the leveling-rod of Fig. 1. Fig. 1$^b$ represents fragmental views of the lower portion of the number-belt similarly juxtaposed to the leveling-rod. Fig. 2 is a side view in detail of the sliding target. Fig. 3 is a similar view of the foot-slide. Fig. 4 is a back face view of the leveling-rod. Fig. 5 is an enlarged detail view of a portion of the new graduated scale. Fig. 6 is an enlarged cross-section of the leveling-rod on line 6 6 of Fig. 1. Fig. 7 is an enlarged cross-section on line 7 7 of Fig. 1; and Figs. 8 and 8$^a$ are two halves of a unitary view of a contour through the earth, illustrating the establishment of a channel for draining a reservoir through the hill, the same being one of numerous applications of my invention. In these views on account of the limitations of a space on the drawing-sheet the right hand of Fig. 8 is supposed to join onto the left hand of Fig. 8$^a$, and these edges should be juxtaposed in reading this divided view.

Referring to Figs. 1 to 7, A is the wooden part of the leveling-rod, on the face of which on one side (the right side of Fig. 1) is displayed the graduated scale $a$, an enlarged detail of which scale and the method of graduation is shown in the fragmental view, Fig. 5. This scale (see Fig. 1) is, as shown, six feet and fifty one-hundredths in length, and at points one foot apart the same numbers are repeated, and between these points the one-foot distance is subdivided into hundredths of a foot and is hereinafter designated as a subscale. The alternate markings (see Fig. 5) are double the width of the others and are more elongated and on one side are made to taper wedge shape to the middle line. The white spaces between the black spaces are the same width vertically as the short black spaces, which is just half the thickness of the larger wedge-shape black spaces. Such white space (and short black space) is in width just one-hundredth of a foot. The making of the alternate black spaces twice as broad, longer, and wedge shape at the inner end is to enable it to be easily distinguished from a distance and to enable the figures designating tenths to be identified with the middle of the larger black spaces.

Just beneath the subscale $a$ the wood of the rod is grooved out on the edge, as seen in Fig. 6, to receive the sliding shank B of the target B′. (Shown in detail in Fig. 2.) This target B′ rests on top of the rod and may be extended a distance above the same and bears at its lower end a pointer $b$, traveling over the scale $a$. This adjustable target is adjusted and fixed in position by a screw-nut B$^2$, Figs. 1 and 7, which turns on a screw-threaded stem $b^3$, attached to a yoke $b^2$ $b^2$, which embraces the rod A and bears against the outer exposed edge of the shank B of the target, so that when the target is slid up or extended and the nut B$^2$ is tightened the shank B of the target will be clamped and held to its adjustment. In a similar groove in the lower part of the rod is arranged a foot-slide C, which may be extended one foot below the leveling-rod and be fixed in its adjustment by a nut C′, screwing onto a shank extending laterally through the rod A. This foot-slide also bears a pointer $c$, traveling over the subscale $a$.

On the opposite side of the rod from scale $a$ the wooden body portion is formed with a shallow groove at front and back to receive an endless belt D, Fig. 6, which travels over a roller F, near the top, and another one, F', near the bottom of the rod. This belt is housed or closed in by a metal facing E at front and back. On the front this facing is perforated with windows e e e, &c., which are just one foot apart, and through these windows show the figures on the endless belt D. The sequence of these figures is such that at a distance of one foot apart throughout the belt the figures advance in regular arithmetical progression by ones—i. e., at the top window e the figure "0" of the belt shows. Then at the second window e below the figure "1" appears, at the third window e the figure "2," and so on. Between these figures showing through the windows at any one time there are other figures, as may be seen on the portion of the belt shown in Figs. 1ª and 1ᵇ, juxtaposed and set opposite the windows of Fig. 1. These figures at points on the belt one foot apart (the distance between windows e) also increase in arithmetical progression by ones—that is to say, if the belt is moved up so that "89" on this belt appears through the top window e then at the next window below, or a distance of one foot below, will appear the figure "90" on the belt. This enables me within the limited length of a relatively short belt D to get numberings which read up to a very much longer measure when viewed through the openings. Thus in the leveling-rod of a little over six feet long the belt as numbered in the recurring figures of arithmetical progression will read up to and serve the purposes of a one-hundred-foot tape or more. This numbered tape belt is moved by hand, and for this purpose the casing E is on the rear side made with an elongated hinged door G, which may be opened to give access to the belt for turning it, as seen in Fig. 4. The back of the rod has a scale s, as seen in Fig. 4, which is an ordinary self-reading scale.

The operation of my leveling-rod is as follows, reference being had to Figs. 8 and 8ª: Let us suppose it is desired to drain a reservoir or lake through a hill by means of a pipe laid on a level with the bottom, the water in the reservoir being ten feet deep and it being desired to know at what depth to lay the pipe at stations equal distances apart. Let zero station, Fig. 8, be at the level of the water and zero-level ten feet below or at the bottom of the reservoir. The leveling instrument I is placed at first position, and wishing to give a reading of ten feet at the point cut by the cross-hairs of the leveling instrument the rod is adjusted as follows: Raise the body of the rod by pushing down the foot-slide C to get a reading of an even number of feet. Then move the belt to give the desired number of feet—viz., ten. No change is made in the rod as now adjusted until the leveling instrument is moved and a back sight taken. As the numbering of the rod is from the top downward, it is evident that as the rod is raised the line of sight will cut the leveling-rod at a distance in excess of ten feet equal to the increased elevation of the position. The rod is accordingly placed at stations 1, 2, and 3, and the readings will be the distance down to zero-level or the bottom of the reservoir. It is now necessary to carry the leveling instrument forward to the second position and take a back sight. The cut at this station 3 or distance to zero-level, as we have already found, is 13.80 feet, and the rod is readjusted to give this reading at a point intersected by the line of level of the leveling instrument at its second position, as follows: Dropping the rod on the foot-slide gives a reading of "80/100," and the belt is moved to bring "13" to view at the opening above, as seen at x. We now proceed to take the levels at stations 4, 5, and 6, which will be the distances down to zero-level, as already explained. At station 6 it is necessary to extend the target B' to bring its center to the line of the level of the instrument. The pointer b being four feet from the center of the target, the reading, as thus indicated, 13.60 feet, less four feet, will be 9.6 feet, the correct reading. In like manner the work proceeds and the level is moved successively to positions 3 and 4. At station 12 we have a reading of ninety-nine feet, which shows we have passed the zero-point and commenced to run backward on another series of one hundred feet or are ninety-nine feet above a level one hunderd feet below the zero we were working from. Subtracting "99" from "100" shows us to be one foot below the point desired; but since the zero-point y at station 12 was in plain view on the face of the rod all that is necessary is to carry the rod back to where zero would come to the level of the eye at the instrument and the foot of the leveling-rod would then stand at the level of the bottom of the reservoir.

In describing the distance between the windows e e as being a foot I would have it understood that this is only to conform to the present United States and British standards of measurement. The space may be a decimeter or any other accepted unit of measurement.

I claim—

1. A leveling-rod having on one side a sub-scale and having beside it windows uniformly spaced apart the definite distance of an accepted unit of measurement, in combination with an endless belt bearing numbers which numbers at points spaced to correspond with the windows increase in arithmetical progression by ones and having also between these numbers other series of numbers similarly spaced and arranged in arithmetical progression.

2. An endless tape-measure having numbers increasing in arithmetical progression, which numbers are uniformly spaced apart the distance of a definite unit of measurement and having, between this series, other series of numbers similarly spaced in arithmetical progression; in combination with a housing having windows spaced apart the distance of the unit of measurement.

3. A leveling-rod having on one side a sub-scale and having beside it windows, an endless tape housed behind the windows and bearing numbers in arithmetical progression showing through the windows and an extensible foot.

4. A leveling-rod having on one side a sub-scale and having beside it windows, an endless tape housed behind the windows and bearing numbers in arithmetical progression showing through the windows, an extensible target and an extensible foot.

5. A surveyor's rod provided with a sub-scale consisting of alternating graduated markings, one set of markings being of the width of the intervening spaces and alternate markings being of twice the width of the first-named markings and extended at one end to a greater length along the middle line and provided with figures.

EDWIN WISWALL.

Witnesses:
WILLARD J. WISWALL,
P. J. CARR.